July 19, 1966 G. C. ROINESTAD 3,261,451
FLAT WIRE CONVEYOR BELT HAVING TAPERED PIN SLOTS
Filed June 29, 1964 2 Sheets-Sheet 1

INVENTOR
Gerald C. Roinestad
BY Irons, Birch, Swindler & McKie
ATTORNEYS

July 19, 1966 G. C. ROINESTAD 3,261,451
FLAT WIRE CONVEYOR BELT HAVING TAPERED PIN SLOTS
Filed June 29, 1964 2 Sheets-Sheet 2

INVENTOR
Gerald C. Roinestad

BY
Irons, Birch, Swindler & McKie
ATTORNEYS

United States Patent Office 3,261,451
Patented July 19, 1966

3,261,451
FLAT WIRE CONVEYOR BELT HAVING TAPERED PIN SLOTS
Gerald C. Roinestad, Winchester, Va., assignor to Ashworth Bros. Inc., Fall River, Mass., a corporation of Massachusetts
Filed June 29, 1964, Ser. No. 378,810
6 Claims. (Cl. 198—193)

This invention relates to conveyor belts and more particularly to collapsible flat wire conveyor belts capable of movement through both a horizontally curved and a straight path.

Flat wire conveyor belts generally comprised of a plurality of continuous tractive wire links slideably interconnected by a plurality of pivotal tractive cross-pins are well known and presently enjoy wide usage in a great variety of industrial fields. Such belts are particularly adapted for usage in situations where the belt must follow a path which is horizontally or transversely curved in the plane of travel of the belt, as disclosed, for example, in Bechtel Patent, 2,872,023. When a belt of this type travels around a curve in the plane of the belt, the stress or tractive load is carried by the radial, outer convex edge portion of the belt while the radially inner, concave portion of the belt is free to contract or collapse.

The collapse of the belt of this type on its inner edge while the tractive load or stress is carried by the outer portion as the belt rounds a curve, however, causes the links of the belt to bend at a certain intermediate point towards the outer edge of the belt. Continued usage of the belt in a curved path with the consequent bending of the links causes the belt to fail at the points of bend. The maximum bending moment normally occurs at the corner or bend adjacent one of the cross-rod openings in each of the links.

To overcome the disadvantages of the prior art, it is an object of the present invention to provide an improved flat wire conveyor belt which is capable of movement through both a horizontally curved and a straight path.

Another object of the invention is to provide such a belt which is readily collapsible and flexible while still possessing considerable strength and lateral stability.

A further object of the invention is to provide an improved flat wire conveyor belt having links with outwardly tapered, substantially slotted cross-pin openings which impart greater strength to the belt.

In general, the invention includes a flat wire conveyor belt comprising a plurality of continuous transverse tractive links of flat wire, each of said links providing a plurality of laterally spaced tractive wire members extending in the general direction of normal straight belt travel, each of said members having a pair of longitudinally spaced slots extending laterally through the sides of said members to define wall segments in said members above and below each of said slots, said slots having a long dimension extending in the normal direction of belt travel, a plurality of pivotal tractive cross pins extending through said slots to interconnect said links, said cross pins being slidable along said slots to permit the collapse of either edge of the belt during travel around lateral curves edgewise of the belt, each of said wall segments in at least those of said members adjacent the marginal edges of the belt which are subjected to repeated flexing during operation of the belt having nonparallel top and bottom edges which converge from the ends toward the middle of the respective members to minimize fatigue failure of said members at said slots.

The invention having been broadly described, a specific embodiment thereof will now be set forth in detail with reference to the accompanying drawings in which.

Figure 1:
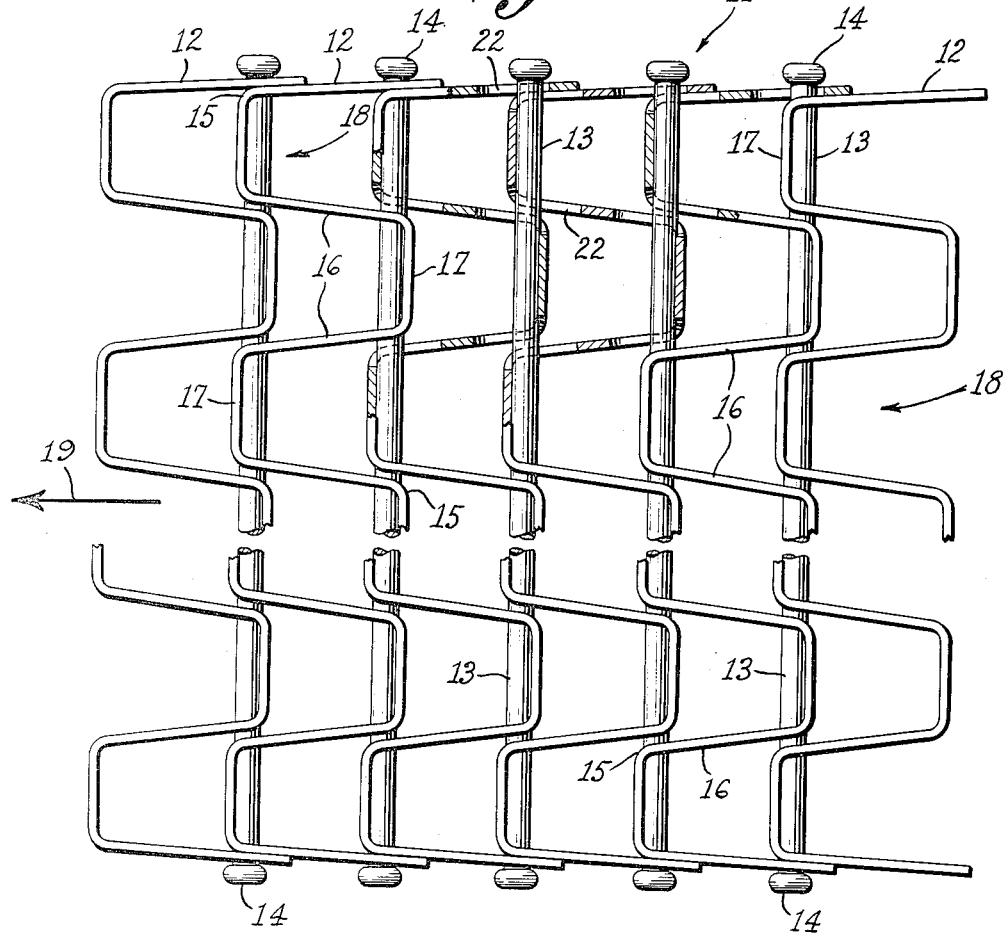
FIGURE 1 is a plan view of a portion of a conveyor belt according to the invention with a portion of some of the links being shown in section.

Illustrated in FIGURE 1 of the drawings is a conveyor belt 11 formed of a flexible mesh fabric, preferably of metal but alternatively of any suitable material. The belt 11 comprises a plurality of tractive flat wire links 12 pivoted together and slideably interconnected by tractive cross-pins 13 which are held against lateral displacement by any suitable means, such as enlarged heads 14.

Each link 12 is fabricated of a similar piece of flat wire which is formed in a series of bends 15 to provide a plurality of elongated, spaced apart wire members 16 which extend in the general direction of the normal movement of the belt. The members 16 are alternately inclined leftwise and rightwise from the longitudinal axis of the belt and are connected at alternate ends by transverse straight end portions 17 to form a plurality of alternate opening, generally wedge-shaped segments 18 in each of the links 12, as most clearly shown in FIGURES 1 and 5.

The wedge-shaped segments 18 of the adjacent links are staggered with respect to each other so that upon longitudinal collapse of the belt as described hereinafter, adjacent links are nested within each other. It is to be noted that when the belt is in a completely uncollapsed or extended position as shown in FIGURE 1, the links are arranged in partially nested relation with the straight end portions 17 of the wedge-shaped segments of respective ones of the links being received in sliding relation within the outer open portions of the wedge-shaped segments of adjoining links. Upon collapse of the belt, respective ones of the links nest more completely within adjoining links in closely fitting relation.

It is to be noted that the belt preferably travels in the direction indicated by the arrow 19 in FIGURE 1 although it will be understood that, if desired, the belt also may be reversed and travel in the opposite direction.

Each of the wire members 16 preferably is provided with substantially slotted cross-pin openings 22 at each each thereof adjacent the associated end portions 17. Although each member 16 is shown with two substantially slotted cross-pin openings, it will be understood that each member may be constructed with only one of the openings 22 slotted while the other opening may be a conventional round hole. Each of the slotted openings 22 is formed with tapered or non-parallel sides 23 which diverge from the end portions of each of the members 16 towards the middle thereof, as most clearly indicated in FIGURES 2, 3 and 5. Thus, a plurality of slotted openings are formed which are wider at the end of the slot towards the middle of the member than at the end of the slot adjacent the end of each member 16. Although the drawings depict each of the slots 22 as being tapered outwardly towards the center of each member, it will be understood that in many belt installations only those slotted openings on the members adjacent the marginal edges of the belt need be slotted, for reasons which will be explained hereinafter.

Each cross-pin 13 extends through the openings 22 at the rear of one link 12 and through the openings 22 in the front of the next succeeding link. With this construction the pins 13 engage the end portions 17 of the adjacent links during normal straight line travel and the pull of the belt is substantially distributed throughout its width with bearing occurring between the cross-pins and the outer end of each slot. The pins 13 serve as pivots about which the links may be pivoted relative to one another to permit the belt to travel around directing pulleys.

By virtue of the elongated slotted openings 22 the belt 11 is adapted to follow a path which is substantially horizontally or transversely curved in the plane of travel of the belt. The belt may travel not only in a circular path but in elliptical, sinuous and many other belt paths. When the belt rounds a curve in the plane of the belt, the tractive load is carried by the radially outer, convex edge portion of the belt and the radially inner, concave portion is free to contract or collapse as the cross-pins 13 slide rearwardly in the slots 22. In this manner, the belt adjusts itself freely to follow the curved path.

Figure 4:
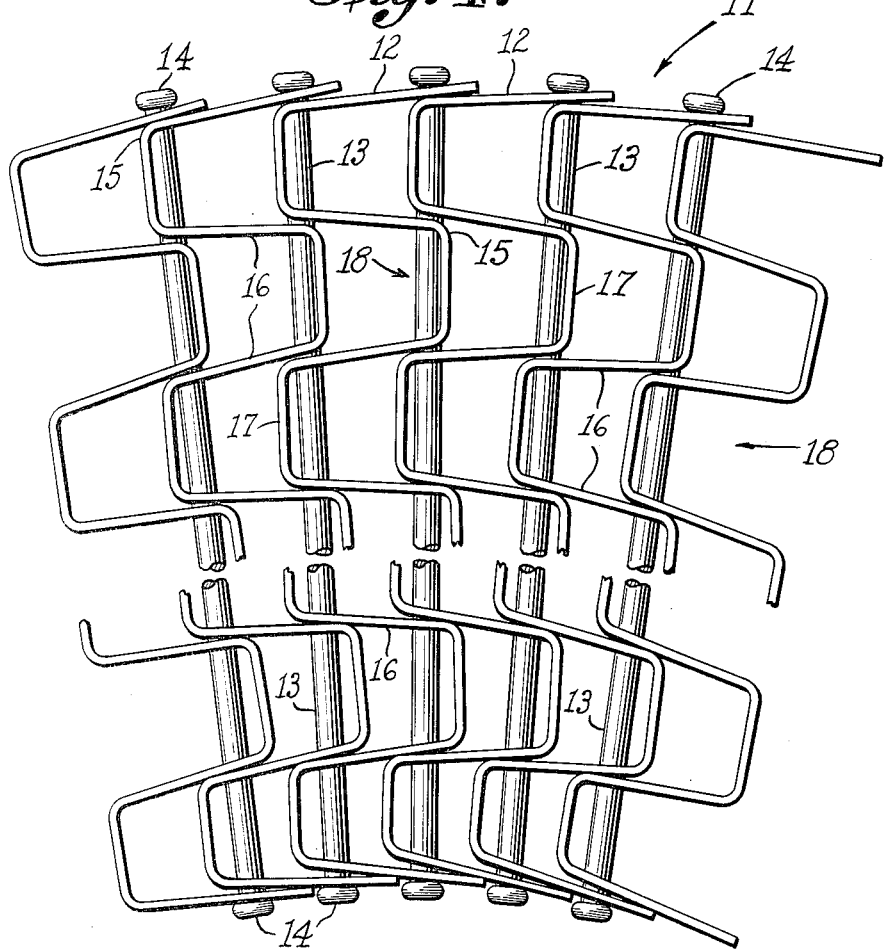
FIGURE 4 is a plan view showing the conveyor belt of FIGURE 1 partially collapsed in its movement through a horizontally curved path.

In view of the fact that the tractive load or stress is carried by the outer portion of the belt while the inner portion collapses as the belt rounds a curve, the individual links of the belt are caused to bend at a certain intermediate point toward the outer edge of the belt. As shown in FIGURE 4 of the drawings, as the belt collapses at its inner edge while rounding a curve, the links 12 gradually move out of contact with the cross-pins 13 toward the inner edge of the belt. Consequently, the bending force is greatest at the last point where the pins and the links are in contact in load bearing relation. Due to the bent construction of the links, this last point of contact normally occurs at one of the bends or corners 15 in the link. Consequently, the maximum bending moment occurs at this corner. The repeated bending of the link which occurs as a result of the belt traveling through a curved path gradually causes the link to weaken at the point of bend until it fails due to fatigue stress.

The use of tapered slots in the links adjacent the bends or corners 15 is highly advantageous in that it increases the life of the links. By tapering the openings 22 there is less material in the members 16 at the wide end of the openings than at the narrow end. Consequently, it is believed that by decreasing the amount of material toward the center of each of the members 16, it spreads the bending into a more gentle or broadened arc. Specifically, the member bends over an elongated portion of the tapered slot rather than bending only at a point or very short length at the end of the slot near the corner of the member. Thus, it can be seen that the life of a belt of this type is greatly increased by tapering away the sides of each of the slotted openings 22.

It is to be noted that since the bending of the links as the belt travels around a curve occurs toward the outer edge of the belt, if desired, only those substantially slotted openings 22 adjacent the marginal edges of the belt need be tapered. The number of members which must have tapered slots will depend upon the width of the belt and the degree of horizontal curvature which it is designed to negotiate.

Figure 2:
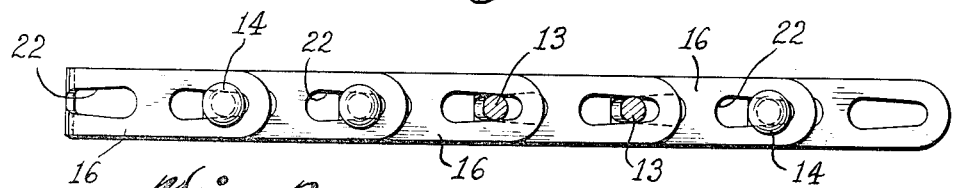
FIGURE 2 is a side elevation of the conveyor belt shown in FIGURE 1.
Figure 3:
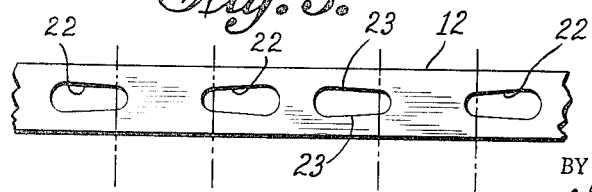
FIGURE 3 is a front view of a fragmentary portion of one of the flat wire links before it has been formed into a plurality of alternate opening, generally wedge-shaped segments.
Figure 5:
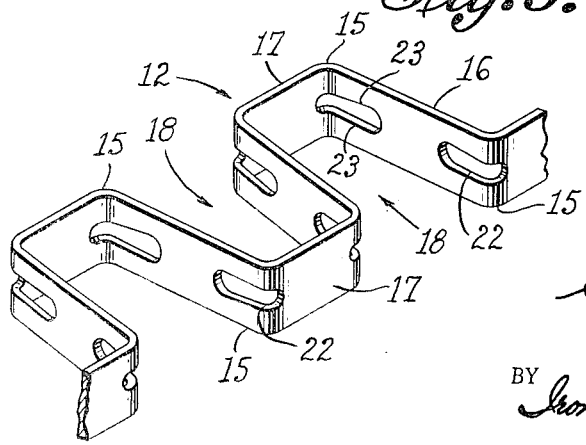
FIGURE 5 is a perspective view of one of the wire links bent to form a plurality of alternate opening, generally wedge-shaped segments.

It should further be noted that, as shown in FIGURE 2, the slotted opening adjacent the outer end of each of the extreme end members 15 of each of the links is of sufficient length that it does not come into bearing contact at its narrow end with its associated cross-pin 13. This is not necessary to the operation of the belt, however, and only arises as the result of a construction expediency. This may be explained by the fact that, as shown in FIGURE 5, each of the slotted openings 22 extends around each of the bends 15 a slight distance into the adjacent end portion 17 to permit the cross-pins 13 to be firmly seated against the end portions 17. Each of the extreme end members 15 are not bent at their outer ends, however, and consequently that portion of the opening 22 which normally would extend around the bend is straight and does not come in contact with the cross-pin 13. This is due to the fact that the cross-pin is retained in position by being seated against the end portions 15 of an adjacent link.

As explained previously, the belt of the present invention is adapted to travel in a horizontally curved as well as a straight path due to the fact that the links adjacent either edge of the belt may collapse one within the other as the belt travels around a curved path. Since adjacent links nest in closely fitting, sliding relation within each other, great lateral stability and strength is also imparted to the belt. Moreover, by tapering outwardly each of the substantially slotted cross-pin openings in at least those members 16 adjacent either edge of the belt, it is believed that the bending force is distributed over a greater length of the link, giving it greater durability.

Although the present invention has been illustrated and described with reference to a specific embodiment, it will be understood that various modifications may be made by persons skilled in the art without departing from the spirit of the invention which is defined solely by the appended claims.

What is claimed is:

1. A flat wire conveyor belt comprising a plurality of continuous transverse tractive links of flat wire, each of said links providing a plurality of laterally spaced tractive wire members extending in the general direction of normal straight belt travel, each of said members having substantially parallel top and bottom edges with a pair of longitudinally spaced slots extending laterally through the sides of said members, said slots having a long dimension extending in the normal direction of belt travel, a plurality of pivotal tractive cross pins extending through said slots to interconnect said links, said cross pins being slidable along said slots to permit the collapse of either edge of the belt during travel around lateral curves edgewise of the belt, the slots in at least those of said members adjacent the marginal edges of the belt which are subjected to repeated flexing during operation of the belt having nonparallel top and bottom sides which diverge from the ends toward the middle of the respective members to minimize fatigue failure of said members at said slots.

2. A flat wire conveyor belt according to claim 1 wherein the slots in all of said members have said nonparallel sides.

3. A flat wire conveyor belt comprising a plurality of continuous transverse tractive links of flat wire, each of said links having a series of bends to provide a plurality of elongated spaced apart tractive wire members extending in the general direction of normal straight belt travel, said members being alternatively inclined leftwise and rightwise from the longitudinal axis of the belt and connected at alternate ends by transverse straight end portions to form a plurality of alternate opening generally wedge-shaped segments in each of said links, said links being arranged in partially nested relation with the straight end portions of said wedge-shaped segments of respective ones of said links being received in sliding relation within the wedge-shaped segments of adjoining links, each of said members having substantially parallel top and bottom edges with a pair of longitudinally spaced slots extending laterally through the sides of said members, said slots having a long dimension extending in the normal direction of belt travel, a plurality of pivotal tractive cross pins extending through said slots to interconnect said links, said cross pins being slidable along said slots to permit the collapse of either edge of the belt during travel around lateral curves edge-wise of the belt, the slots in at least those of said members adjacent the marginal edges of the belt which are subjected to repeated flexing during operation of the belt having nonparallel top and bottom sides which diverge from the ends toward the middle of the respective members to minimize fatigue failure of said members at said slots.

4. A flat wire conveyor belt according to claim 3 wherein the slots in all of said members have said nonparallel sides.

5. A flat wire conveyor belt comprising a plurality of continuous transerve tractive links of flat wire, each of said links providing a plurality of laterally spaced tractive wire members extending in the general direction of normal straight belt travel, each of said members having a pair of longitudinally spaced slots extending laterally through the sides of said members to define wall segments in said members above and below each of said slots, said slots having a long dimension extending in the normal direction of belt travel, a plurality of pivotal tractive cross pins extending through said slots to interconnect said links, said cross pins being slidable along said slots to permit the collapse of either edge of the belt during travel around lateral curves edgewise of the belt, each of said wall segments in at least those of said members adjacent the marginal edges of the belt which are subjected to repeated flexing during operation of the belt having nonparallel top and bottom edges which converge from the ends toward the middle of the respective members to minimize fatigue failure of said members at said slots.

6. A flat wire conveyor belt according to claim 5 wherein the wall segments in all of said members have said nonparallel top and bottom edges.

References Cited by the Examiner

UNITED STATES PATENTS

| 1,907,636 | 5/1933 | Woodman | 198—193 |
| 1,907,637 | 5/1933 | Woodman | 198—193 |
| 2,872,023 | 2/1959 | Bechtel | 198—182 |

EVON C. BLUNK, *Primary Examiner.*

RICHARD E. AEGERTER, *Examiner.*